Fig.3.

UNITED STATES PATENT OFFICE.

LENNA RYLAND WINSLOW, OF CHICAGO, ILLINOIS.

VOTING-MACHINE AUXILIARY INTERLOCK.

963,104.  Specification of Letters Patent.  Patented July 5, 1910.

Original application filed November 10, 1899, Serial No. 736,502. Divided and this application filed July 15, 1908. Serial No. 443,691.

*To all whom it may concern:*

Be it known that I, LENNA R. WINSLOW, a citizen of the United States, residing at Chicago, in the county of Cook and State of Illinois, have invented a new and useful Voting-Machine Auxiliary Interlock, (Case D',) of which the following is a specification.

This invention relates to voting machines of that class disclosed in my copending application filed November 10, 1899, Serial No. 736,502, of which this application is a division, and the object of the present invention is to provide full-stroke interlocking devices for preventing the fraudulent manipulation of the counter-actuating devices and to facilitate the adjustment of the mechanism for various classes of voting; to provide supplemental interlocking devices to assist in preventing the fraudulent manipulation of counter-actuating devices and guard against the simultaneous operation or successive partial operations of two or more counter-actuating devices in different single-candidate series; and to provide efficient and reliable replacing devices for the different parts of the mechanism.

Further objects and advantages of this invention will appear in the following description, and the novel features thereof will be particularly pointed out in the appended claims, it being understood that various changes in the form, proportion and the minor details of construction may be resorted to without departing from the spirit or sacrificing any of the advantages of this invention.

In the drawings Fig. 5 is a plan view of a series of main interlocking blocks, and portions of the operating elements of the voting keys associated therewith.

Similar reference characters indicate corresponding parts in all the figures of the drawings.

In the illustrated embodiment of the invention the machine consists essentially of counters, main interlocking devices, secondary interlocking devices, auxiliary or full-stroke interlocking devices, supplemental interlocking devices, limiting mechanism, lock-out or restrictive mechanism, and releasing and replacing mechanism, but while it should be understood that for purposes of clearness in disclosure the auxiliary or full-stroke interlocking devices and the supplemental interlocking and the limiting devices are illustrated and described in connection with specific constructions of other parts necessary to constitute an operative machine, the utility and efficiency of said full-stroke and supplemental interlocking and the limiting devices whereby the manipulations of the voter are controlled, are not dependent upon any special construction or arrangement of such other parts as the tally mechanism, proper, the counter-actuating devices, the main and secondary interlocking devices of the restrictive mechanism, all of which, in the forms illustrated in this case, form the subjects of other co-pending applications as follows, to wit: Serial No. 443,688, filed July 15, 1908; Serial No. 443,689, filed July 15, 1908; Serial No. 443,690, filed July 15, 1908; Serial No. 736,502, filed Nov. 10, 1899, and Serial No. 443,691, filed July 15, 1908.

The counters in the construction illustrated, as in many machines of the same general class, are arranged in single-candidate series or "office rows," all of the counters in a single series or row being assigned to candidates for the same office, and each counter consisting of an actuating member including a slide 15 having an exposed button 16 and connecting stem $16^a$, and a tally mechanism; consisting of dials 9 for exposure through suitable openings 2 in the front of the casing; a ratchet wheel 14, and suitable motion-communicating gears of any preferred construction for conveying a step-by-step motion from said ratchet wheels to the dials. The actuating member has a ratchet operating pawl 333 for communicating motion to the tally mechanism, the same being shown in mesh with the ratchet gear 14. The tally mechanisms are supported adjacent to and in vertical columns between partitions 3 in the casing 1. In the construction illustrated the single-candidate series are arranged horizontally, thus disposing the party-columns vertically, and through suitable openings 8 in the front walls 7 of the boxes or shells in which the registering devices of the tally mechanisms are housed, are exposed one numeral on each of the dials 9.

The counter-actuating member, in addition to the operating element consisting of the slide 15, includes an operated element consisting of a slide 332 constructed to receive motion from the operating element and carrying the above-mentioned ratchet operating pawl 333. This operated element is mounted in suitable guides and is provided with a headed guide-pin 355, said operating and operated elements being provided with coacting pins 20 and 337, all of which parts are constructed and arranged substantially as shown and described in the above-mentioned co-pending application of which this application is a division.

Figure 1:
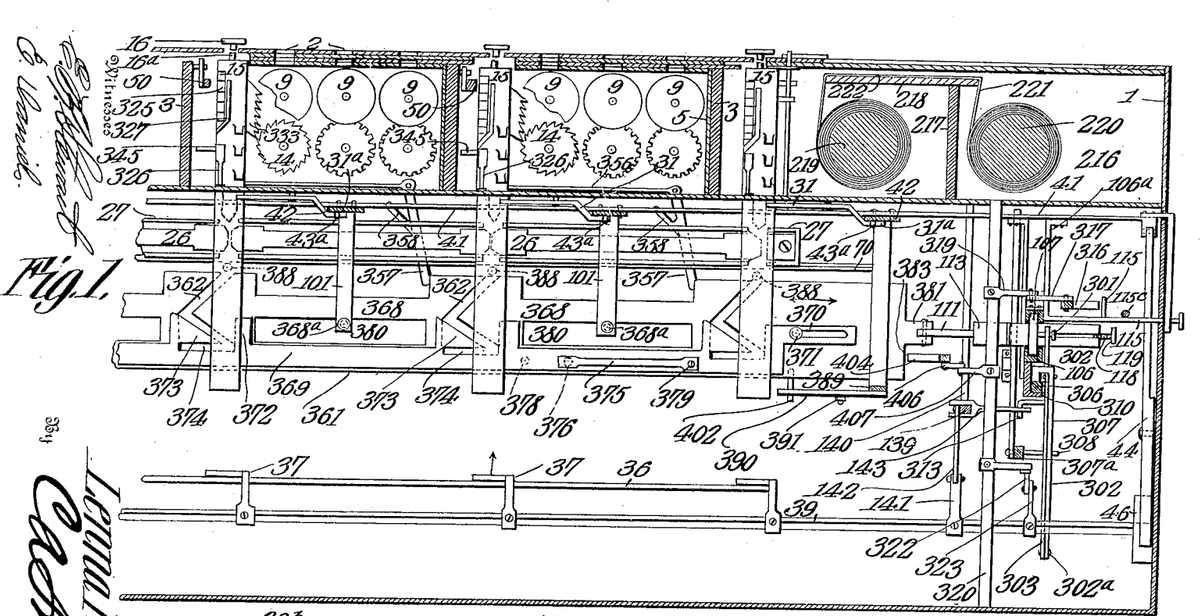
—Figure 1 is a plan view in section of a portion of a voting machine constructed in accordance with the invention.
Figures 2, 6:
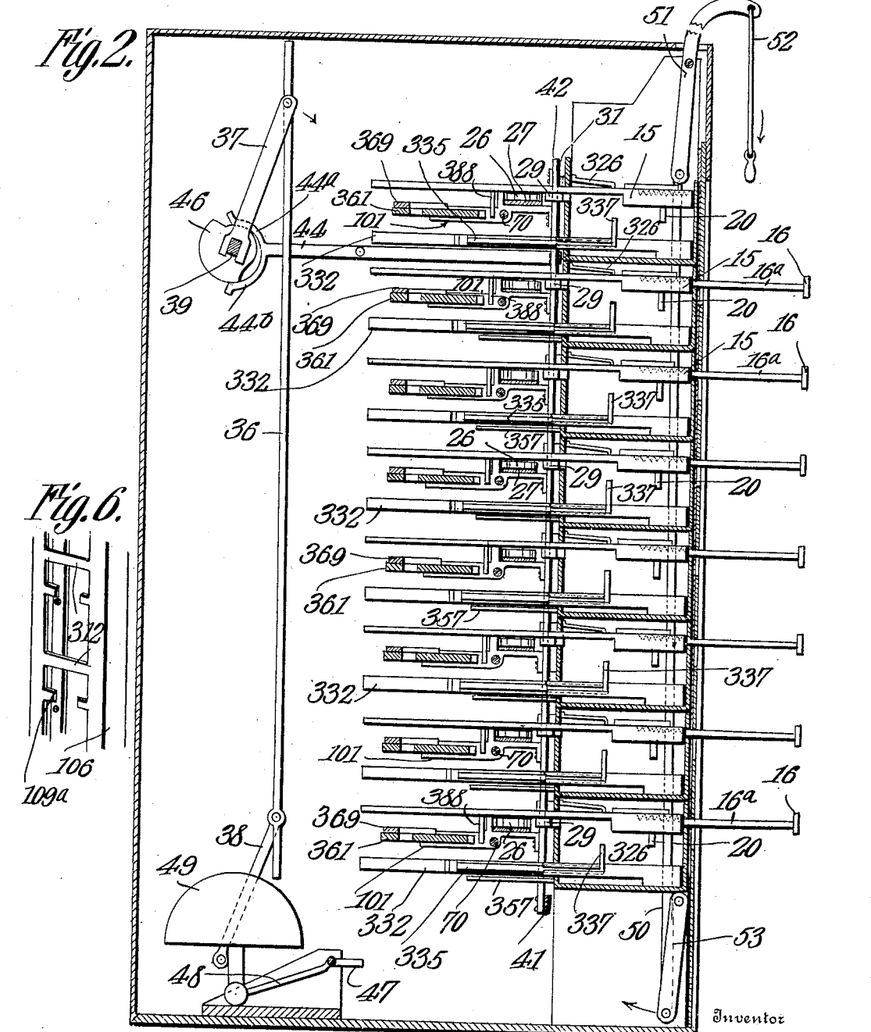
Fig. 2 is a vertical sectional view of the same.
Fig. 6 is a detail view in perspective of a portion of the guide for the sectional interlocking blocks.

The straight-ticket voting element illustrated in Fig. 2 consists of a lever 51 having a grip 52, the extremity of the inner arm of the lever being connected by a straight-ticket rod 50 with a link 53, whereby the operation of the lever causes the rearward movement of the bar 50 to cause contact with lateral projections 345 of the operated elements of the counter-actuating devices, the relation between these parts being illustrated in Fig. 1.

Whereas in the construction illustrated the operated elements of the counter-actuating devices are capable of a variable movement to impart corresponding variable movements to the tally mechanisms, to suit different conditions of voting, the operating element has a full-stroke movement controlled by certain full-stroke interlocking devices hereinafter described, but whereas under certain conditions, as in cumulative voting, it is necessary to permit the voter, after imparting a full-stroke movement to the operating element, to withdraw it for a succeeding movement, and in order to insure the full retraction of the key before imparting a second full-stroke movement thereto, there is provided on each slide 15 a ratchet 325 adjacent to which is arranged a guard 327 having a deflected rear end forming a cam 328, and mounted on the rear wall of the box or shell of the tally mechanism is a laterally yieldable pawl 326 which, when the slide 15 is advanced, is terminally deflected by the cam 328 and is retained in this deflected position until the forward end of the guard 327 is reached, when the resilience of the pawl returns it to its normal position in alinement with the slide, and in engagement with the teeth of the ratchet 325. The slide 15 may now be withdrawn and the extremity of the pawl 326 will slide idly over the teeth thereof, but should this return movement of the slide be interrupted at an intermediate point, and the voter attempt to make a partial advance movement thereof, it will be prevented by the engagement of the pawl with the teeth of the ratchet. Not until the slide has been entirely withdrawn, and the extremity of the pawl deflected by the front side of the cam, can a succeeding advance movement of the key be accomplished.

To prevent the withdrawal of the slide 15, except in cumulative voting, pawls 31 are provided to successively engage a series of notches 32, 32$^a$ and 33 formed in the upper side of the said slide. A series of these notches is employed to prevent the withdrawal of the key after a partial voting movement thereof. The positive means employed for returning the operating and operated elements of the voting devices to their normal positions after a voter has cast the permitted number of votes consists of a replacing frame 36 similar to that illustrated and described in my former Patents No. 611,403 and No. 621,511, the same being carried by arms 37 and 38, of which the former are carried by a replacing shaft 39 mounted for rocking movement in the casing 1. Mounted for vertical movement adjacent to the rear sides of the tally boxes is a releasing frame consisting of horizontal bars 41 and uprights 42, said releasing frame being carried by levers 44 having yokes 44$^a$, 44$^b$ actuated by cams 46 on the replacing shaft 39.

In practice the replacing shaft is adapted to be actuated by a booth door so that the exit of a voter from the booth serves to return the voting elements to their normal positions, and the first operation of the shaft 39 is to repress the releasing frame 41—42 and then bring the replacing frame 36 into contact with the rear ends of the operating and operated elements of the counter-actuating devices. Arranged on the uprights of the releasing frame are lower and upper studs 43 and 43$^a$ between which the tails or extensions of the slide-locking pawls 31 are normally arranged, whereby the downward movement of the releasing frame causes the contact of the studs 43$^a$ with the tails of the locking pawls to disengage said pawls from their notches 33 of the slides 15. When the parts are adjusted for cumulative voting, wherein the voter is permitted to withdraw the slide 15 preparatory to imparting a succeeding full-stroke movement thereto, the tails of the pawls 31 must be depressed and engaged under the lower studs 43, whereby the said pawls are locked out of operative relation with the notches 32, 32$^a$ and 33.

In order to prevent simultaneous operation of two counter-actuating devices in the same single-candidate series, there is provided main interlocking mechanism consisting of blocks 26, a series of which is arranged adjacent to each single-candidate series in a guide 27 supported by brackets 101 carried by the releasing frame, the combined lengths of said blocks being so proportioned with relation to the length of the guide as to permit the introduction into the guide of the cam 29 on one only of the slides 15, each slide being provided with one of these cams, and each having its rear and front ends beveled as shown at 29$^a$—29$^b$. When a key is advanced during the act of casting a vote, the full-stroke movement thereof carries the cam 29 through the guide 27 and after the operated key has received its full-stroke movement the interlocking blocks 26 are released so that another key in the same horizontal series may be advanced, subject to the control of limiting mechanism or other devices hereinafter described. Also, in cumulative voting, when it is permitted for the voter to withdraw a voted key for subsequent operation, the forward cams 29$^b$ serve to again separate the locking blocks. Inasmuch as the guides 27 are carried by the releasing frame, the downward movement of the latter when the replacing shaft 39 is actuated, removes the guide 27 with the locking blocks from the paths of the cams 29 so that the replacing frame may return the keys to their normal positions without interruption.

The auxiliary interlocking devices consist of slides also arranged parallel with the single-candidate series of counters, and mounted in the brackets 101 whereby they are supported on the releasing frame 41, each slide having relatively adjustable members 361 and 369 provided with correlative guide members for coöperation with pins 388 on the keys or slides 15. These slide members 361 and 369 are adapted for relative longitudinal adjustment to vary the configuration of the guide slots, and are held in their adjusted positions by the locking device 375 having a terminal pin 376 for engagement with either of the openings 377 and 378 in the slide 361. By the coöperation of the pins 388 with the slots 362 the auxiliary interlocking device is longitudinally shifted when the voting key is advanced, and, therefore, other voting keys in the same candidate series are locked against movement until after the first key has been withdrawn to replace the slide, or until the full-stroke movement of the key has restored the slide to its normal position. When the members of the auxiliary interlocking device are arranged in the relative positions indicated in Figs. 1 and 9, the triangular member 373 of the slide 369 covers a portion of the opening 363 of the slide 361, and thus forms with the obliquely disposed wall 366 of said opening an oblique slot 363 which forms a continuation of the slot 362, whereby when the pin 388 is advanced by the operation of a voting key the slide is first moved in the direction indicated by the full-line arrow at the right in Fig. 1, until it reaches the point 364$^a$, whereupon a continuance of the advance movement of the key causes the movement of the slide in the opposite direction, as indicated by the dotted line arrow in said figure, until the pin reaches the dotted line position in alinement with the longitudinal slot 374.

Figures 8, 9:
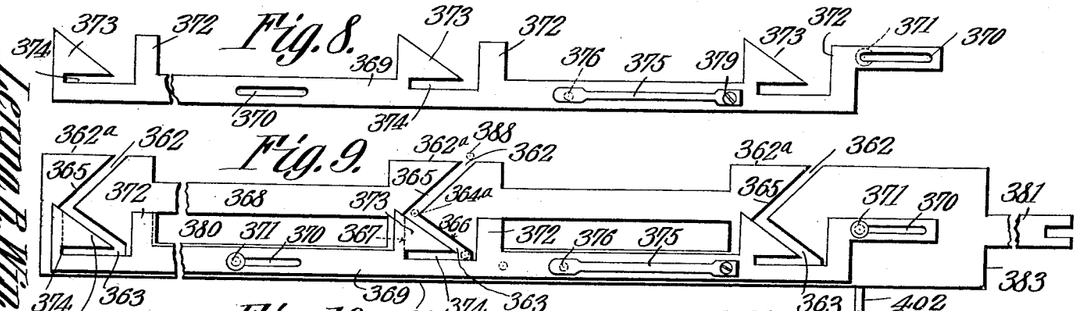
Fig. 9 is a similar view showing the main and auxiliary slides operatively related in one position.
Figures 10, 11:
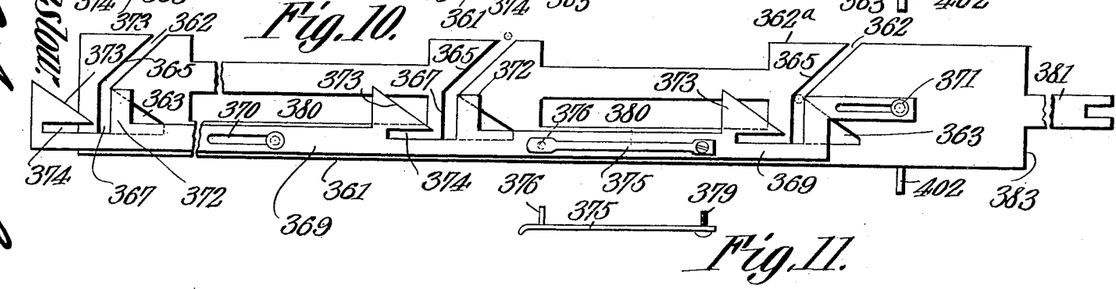
Fig. 10 is a similar view showing the said slides operatively related in another position.
Fig. 11 is a detail view of the latch or locking device whereby the main and auxiliary slides are secured in their adjusted relative positions.

When the parts are adjusted as in Fig. 9, the retraction of the key is prevented by the pawl 31, but other voting keys in the same single-candidate series may be operated, because by the return of the slide to its normal position as above described the entrance ends of the slots 362 are brought into alinement with the pins 388 of the remaining keys of the series. Prior to this complete return of the slide to its normal position, due to the full-stroke movement of the operated voting key, the stop edges 362$^a$ of the slide 361 are in the paths of movement of the pins 388 of the remaining keys. On the other hand, when the members of the auxiliary interlocking device are arranged in relative positions indicated in Fig. 10, wherein the slide 369 is adjusted to the left, the transverse ear or projection 372 of the slide 369 forms with the transverse wall 367 of the opening 363 a transverse slot which communicates with the slot 362, whereby when a voting key is advanced the pin 388 moves the slide in the direction indicated by the arrow at the right, and thence passes into the transverse portion of the slot without imparting a return movement to the slide. This relative adjustment of the members of the slide is adapted for single-ticket and cumulative voting. By withdrawing the voting key, pin 388 in contact with the wall 365 of the slot 362 will return the slide to its normal position and thus aline the entrance openings of all of the slots 362 with the pins 388 of the keys. Any suitable means for mounting the member 369 on the member 361 may be employed, such as a slot 370 engaging the headed guide pin 371.

The secondary interlocking devices embody a guide 106, also carried by the releasing frame 41 and supported by brackets 106$^a$; and secondary interlocking blocks 107 mounted in the guide 106, spacers 111 being interposed between the adjacent ends of blocks 107, extending through the guide and respectively connected with the auxiliary interlocking devices, so that the operation of the movable element of the counter will cause the longitudinal movement of a spacer through the guide 106, and the elevation of the superposed block 107 by means of a cam 113 on said spacer. Also carried by each spacer is a filling block 117 mounted thereon to slide, and adjustable by means of a feed screw 118 having a head 119. The blocks 107 are so proportioned with relation to the guide and the intervals between adjacent spacers, that the inward adjustment of a filling block to occupy a position in the plane of the guide will fill the space between the spacer upon which it is mounted and the upper end of the subjacent interlocking block 107. The spacers are pivotally connected as at 382 with the ends of the auxiliary interlocking devices which have projections 381 for that purpose, to adapt them for vertical swinging movement. Each spacer rests normally on supporting ears 109$^a$ projecting inward from the sides of the guide 106, and is limited in its upward swinging movement to a distance approximately equal to the thickness of the filling block 117, or the thickness of the cam 113, by a stop 312 also disposed transversely in the guide 106. The only exception to the above described construction of spacers is that the uppermost one of the entire series which relates to the straight-ticket voting devices and is connected with the auxiliary interlocking slide which coöperates with the straight-ticket series of the counters, has a double cam 113$^b$ for simultaneous introduction into the guide 106 when a straight-ticket counter is actuated.

Figure 3:
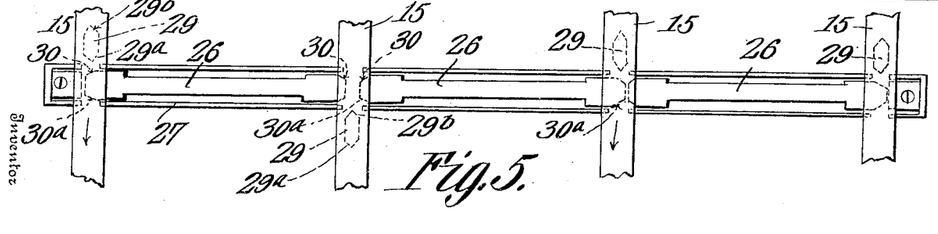
Fig. 3 is a rear view of a portion of the operating mechanism.

An idle lock-out block 107$^x$, corresponding in construction with those heretofore described, is mounted in the guide above and rests on the straight-ticket spacer for a purpose hereinafter explained. When the straight-ticket spacer is advanced into the guide the cam 113$^b$ raises the superposed lock-out block and the cam 113$^a$ occupies a position in the path of the subjacent block 107, and, therefore, prevents the subsequent elevation of said subjacent block by the operation of the next lower spacer, and if the filling blocks, for instance, in the series A, B and C are adjusted into guide 106, as shown in Fig. 3, the advance of the straight-ticket spacer will prevent the introduction of a spacer of either of the series of A, B, C and D into the guide, and hence will lock said spacers against longitudinal movement, and will correspondingly lock the counters of those series. It should be understood, moreover, that if the filling blocks of all of the series were adjusted into the guide, the only unoccupied space for permitting vertical movement of the spacers and blocks 107 would be that between the upper end of the uppermost interlocking block of the group, and the straight-ticket spacer, and as the movement of any spacer of the group into the guide will elevate this uppermost block, and also any other block and spacers which may be above it, and as vertical swinging movement of any spacer is prevented by the stop 312 when the cam 113 of said spacer is advanced into the guide, only one spacer of an entire group may be advanced at one time, and, therefore, the simultaneous operation of two or more counting devices in different single-candidate series or office rows, is prevented. When the filling blocks 117, as, for instance, of the spacers D, E, F, and G, are adjusted out of the plane of the guide 106, the simultaneous operation of two or more of the spacers in the series E, F and G is permitted, because there is an interval equal to the thickness of a cam enlargement 113 between the upper end of each block 107 and the spacer thereabove.

In addition to the above-described main, secondary and auxiliary interlocking devices, it has also been found desirable under certain circumstances to use what may be termed "supplemental" interlocking devices (see Fig. 3), which consist of members 390 pivotally mounted upon a frame-bar or support 389 and having cam slots 398 for the reception of pins 402 carried by the auxiliary interlocking slides, these members of the supplemental interlocking devices being adapted for arrangement in groups, as for instance A, B, C and D, by links 391, which may be positioned to connect the member 390 of one series with the corresponding member of the series above, or may be allowed to occupy a folded position, as indicated in the series E, F, G, catches 397 being employed to lock said links in their connecting positions. When a key in the single-candidate series is advanced to its voted position the pin 402 enters the cam slot 398 of the member 390, thus raising the latter and all of the connected members, and thus disposes the stop formed by the end shoulder 403 of said connected members in the paths of the pins 402 of the other auxiliary interlocking devices in that group. The return movement of the operated auxiliary interlocking device withdraws the pin 402 and thus returns the members 390 of the supplemental interlocking devices to their normal positions with the tongues 401 resting on the pins 402. The cam surfaces 399 and 400 at opposite sides of the cam slots insure the positive operation of the members 390 by the movement of the interlocking devices, see Fig. 3. In the construction illustrated, the links 391 are pivoted at 392 and are provided with pins 393 to engage sockets 395 in the tumblers, said links 391 having projections 394 for engagement by the latches 396 which are pivoted at 397.

The limiting mechanism which is illustrated in connection with the above-described mechanism, is designed for limiting the number of successive operations of the counter in the same or different single-candidate series or office rows, when the other parts of the apparatus are adjusted for class or minority representation, or for cumulative voting. When the apparatus is adjusted to vote for single candidates, or, in other words, for individual voting, each unrestricted voter is entitled to operate a counter in each of the single-candidate series or office rows, but after having voted for a candidate for a given office, as by advancing a voting key, all of the other counters in the same candidate series are locked out by the interlocking mechanism provided for that purpose, the auxiliary interlocking devices being set in the position indicated in Fig. 3 to retain the spacer with its cam 113 in the guide 106, and the operated key is held from retraction by suitable locking mechanism such as the pawls 31 engaging the notches 33. Obviously, the operation of a counter in each single-candidate series advances the spacer of that series into the guide of the secondary interlocking devices, and when a vote has been cast for each office, further operation by that voter is impossible, and the machine is not reset for subsequent operation until the voter withdraws from the booth in which the voting mechanism is usually arranged, it being common in the art to provide such booth with a turn-stile door or other closure, for means of ingress and egress which is connected with suitable releasing and replacing devices, as by the shaft 39. In class voting, on the other hand, where a number of candidates are placed in the field by each party and a corresponding number of officers of the same grade are to be elected, as, for instance, for presidential electors, when each party places three candidates in the field, and three electors of the same or different parties are to be elected, or in minority representation voting, when each party places a number of candidates in the field and a less number of officers of the same grade are to be elected as when each party places three candidates in the field but two of the same grade but of either party may be elected it is necessary to provide for arranging a plurality of single-candidate series or office rows of counters in a group, as, for instance, the series A, B, C and D, Fig. 3, and so relating them that whereas only one counter in the entire group may be operated at a time, and whereas one counter having been operated cannot be a second time operated, any other counter, whether in the same or a different candidate series may be subsequently operated, and this successive operation may be continued until the full number of votes to which the voter is entitled have been cast, when the mechanism will be locked and further operation of any counter of that group may be prevented. And in cumulative voting, where a number of candidates are placed in the field by each party and a corresponding number of officers of the same grade, but of any party, are to be elected, but where each voter is entitled to apply his vote as he prefers and either cast one vote for each of a number of candidates corresponding with the number of officers to be elected, or more than one vote for each of a less number of candidates, as for alderman, when, for instance, three candidates are placed in the field by each party, each voter is entitled to cast one vote for each of three candidates, or one and one-half votes for each of two selected candidates, or three votes for one selected candidate, it is necessary to provide means for permitting the repeated operation of each counter, or the successive operation of two or more counters and without permitting successive partial operations of the same counter, or the operation of a second counter until after the first counter has been wholly withdrawn or retracted to its normal position, provided the total number of successive operations, whether of the same or different counters, is limited to the number to which a given voter is entitled, the mechanism arranged in a group being locked to prevent the further operation of any of the counters thereof after a number of operations, sufficient to cast the allowed number of votes or half votes, have been accomplished.

Figure 4:
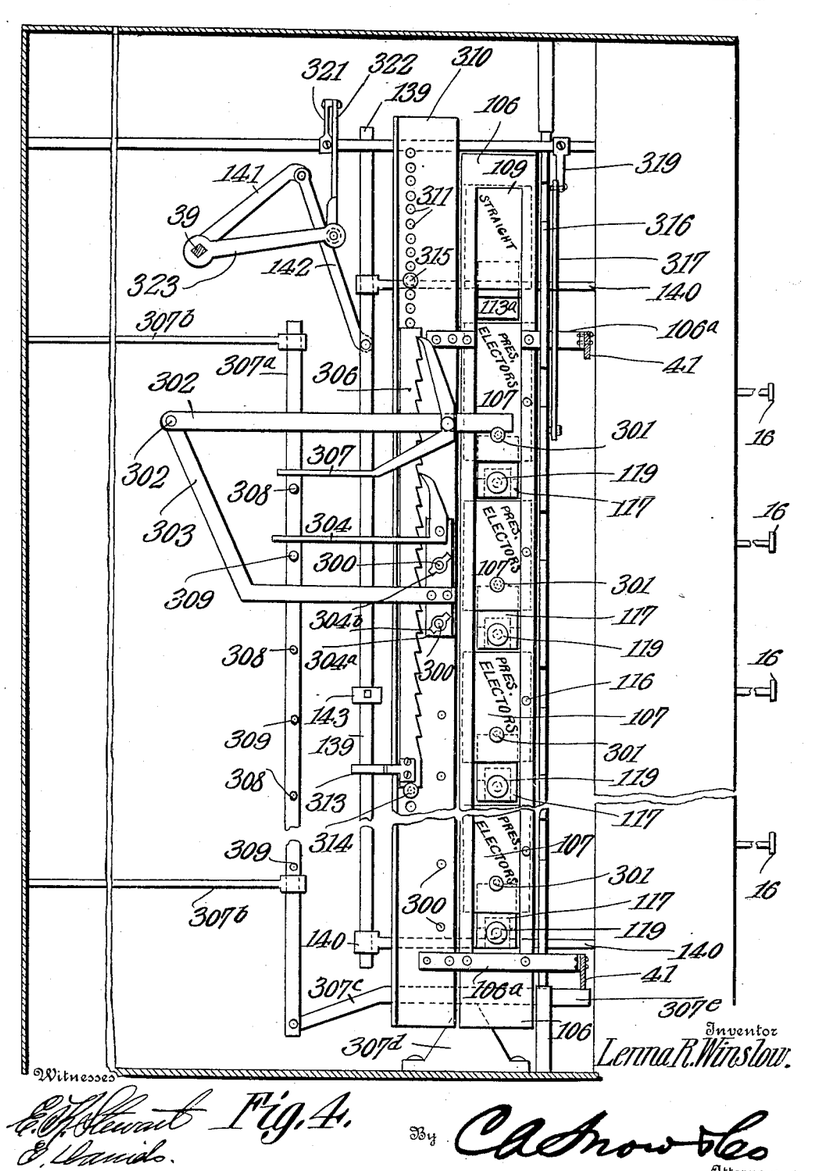
Fig. 4 is an end view showing the casing sectioned on the plane indicated by the line 4—4 of Fig. 1 to show the limiting devices.
Figure 7:
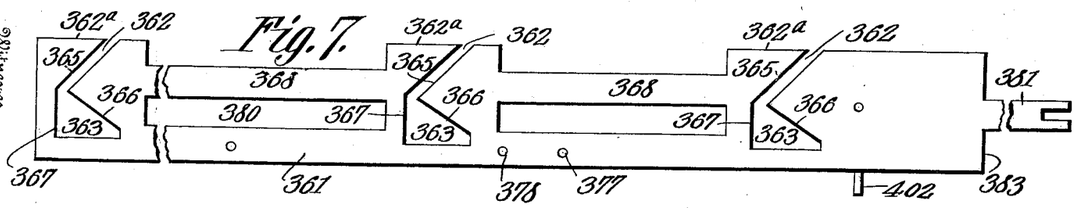
Figs. 7 and 8 are plan views of the main and auxiliary slides for the auxiliary interlocking devices.

The control of the counters to adapt the mechanism or a portion thereof for either class or minority representation or cumulative voting, is accomplished by means of the interlocking devices, such as those hereinbefore described, and more particularly by the auxiliary interlocking devices by which the spacers which coöperate with the blocks of the secondary interlocking mechanism are actuated, the pins 388 which coöperate with the cam slots 362 of the slides 361 and 369 being employed to withdraw the cams 113 of the spacers from the guides 106 when repeated operations of the same counter are to be permitted, or when subsequent operations of other counters in the same candidate series are permitted, and the employment or displacement of positive locking devices for the counters, such as pawls 31 which coöperate with the notches 33 of the slides 15, controlling the repeated or successive operations of the counters. Under either of the above-mentioned conditions, however, it is necessary, as will be seen, to provide means for limiting the number of operations of the counters, whether the same or different, and as the parts are so related as to cause the advance of a spacer into the guide of the secondary interlocking devices for each operation of a counter, and as the uppermost block 107 of a group rises in the guide when any spacer of that group is advanced, as hereinbefore described, it is only necessary to limit the number of operations of the uppermost block of the group to a number corresponding with the number of full-stroke operations to which each voter is entitled in order to insure the desired limitation and prevent the casting of more than the proper number of votes. The means which are illustrated, for accomplishing this limitation of the number of operations of the uppermost interlocking block of a series, consists of a rack 306 mounted in a guide 310 supported by the brackets 106$^a$ (which also support the guide 106); a pawl frame consisting of a block 304$^a$, a bracket 303 attached to the block, and a lever 302 pivotally mounted upon said bracket; a check pawl 304 mounted upon said block; and a lug or pin 301 projecting laterally from said uppermost block 107, and having the free end of the lever 302 resting thereon (see Fig. 4) in order to provide for arranging any preferred candidate series in a group and limiting the number of vertical movements of the uppermost block 107 in that group, each block 107 is provided with a lateral pin or lug 301, and the block 304$^a$ is provided with openings for the reception of pins 300 which extend laterally from the guide 310, whereby the block may be arranged to lock the feed pawl and lever in relation to either of the blocks 107, a thumb-nut 304$^b$ being threaded upon the extremity of each of the pins 300 which are engaged with the openings of said block 304$^a$. As a counter in the group of candidate series is operated, the spacer connected with the interlocking devices of that series is advanced into the guide 106, thereby raising the uppermost block 107 of the group and correspondingly raising the feed pawl, and, therefore, the rack 306. Subsequent downward movement of the rack is prevented by the check pawl, while the feed pawl drops into engagement with the next lower tooth when the interlocking block 107 returns to its normal position. The number of successive upward steps of the rack is limited by a stop pin 315, adapted for engagement with either of a series of seats or openings 311 in the guide 310. The initial or normal position of the rack 306, to suit the location of the group of connected series and the location of the feed pawl, is controlled by a rest pin or stop 314 below the lower end of the rack and also adapted for engagement with either of a series of seats or openings in the guide 310. When the rack has been advanced by successive operations of the feed pawl until its upper end comes in contact with the stop pin 315, further upward movement is prevented, and hence subsequent elevation of the uppermost interlocking block 107 of the group is prevented, and, therefore, the introduction of either of the cams 113 into the guide is prevented, and operation of the counters in that group is impossible.

The lock-out or restrictive devices coöperate with the secondary interlocking devices, and consist essentially of lock-out pins 115$^x$ exposed at their outer headed ends 115$^a$ beyond the wall of the casing within reach of the election officers or attendants and disposed in alinement with openings or sockets 116 (see Fig. 4) in the secondary interlocking blocks when the latter are in their normal positions. Inasmuch as the introduction of a cam 113 into the guide 106 is dependent upon the elevation of the superposed block 107, it is obvious that the locking of this block in its normal or lower position, resting on the spacer, will prevent the operation of that spacer and hence of the counters in the connected or related candidate series. The lock-out pins preferably extend through slots in the wall of the casing, and are mounted for reciprocatory movement in a slide 1$^d$ disposed to cover said slots and connected by brackets 1$^b$, also extending through slots in the casing, with the releasing frame 41, so that the entire series of lock-out pins is movable vertically with the guide 106 and related parts. For frictionally holding the lock-out pins in their adjusted positions, a spring rod or wire 115$^c$ is interlaced in and out through the series of pins, bearing upon opposite sides of adjacent pins. As each lock-out pin is in accurate alinement with the socket or opening of the block with which it coöperates when said block is in its normal position, it will be seen that but a touch by the operator is necessary to advance the pin into engagement with the block and lock out that series of counters, so that a restricted voter may be prevented from voting improperly, either fraudulently or by mistake. Obviously, moreover, when it is desired to restrict a voter it is necessary to lock out the straight-ticket mechanism, and this is accomplished by means of a pin 115$^x$ corresponding with those above described, which is arranged normally in registration with a socket or opening in the idle block 107$^x$ which rests upon the straight-ticket spacer and which rises and falls by the operation of the cam 113$^b$. This straight-ticket lock-out mechanism may be employed when the mechanism, or a portion thereof, is adapted for class or minority representation or cumulative voting.

In all machines of this class it is desirable to use simple and direct means for releasing and replacing the parts of the counter-actuating and interlocking mechanisms after the conclusion of the operations of a voter, and in the particular embodiment of the invention these releasing and replacing devices receive their motion from a common re-setting shaft 39, hereinbefore mentioned and referred to in the former patents above cited, which in turn may be actuated either by an election officer or by a door or turn-stile, whereby the ingress to and egress from the booth are controlled, said shaft carrying the replacing frame and controlling through levers 44 the releasing frame 41 as above described, the motion of the frame 41 serving to disengage the pawls 31 from the slide notches 33. Moreover, whereas those spacers which are grouped or arranged for class or other similar voting, and hence which are not returned to their normal positions, with the cams 113 withdrawn from the guide 106, by the direct operation of the counter-actuating devices, or an element of the counter mechanism, must be returned after the conclusion of the voting operation, and the means employed for accomplishing this operation consist of a replacing bar 404 mounted for vertical movement in suitable guides in the top and bottom of the casing, and having a series of bevel or cam faces 405, one for each spacer, and adapted when the bar is moved, preferably upward, to come in contact with shoulders 383 on the auxiliary interlocking slides; and means for communicating motion to this bar from the re-setting shaft. By this arrangement of parts the replacing bar receives a spacer-returning movement each time the shaft 39 is actuated in one direction, and said bar retains its adjusted position and thereby locks the spacers against movement until the shaft 39 receives a motion in the opposite direction, which withdraws the bar 404 from the paths of the shoulders 383 and leaves the spacers free to be actuated.

To return the limiting mechanism to its normal position, it is desirable to employ (1) a releasing device and (2) a positive replacing device. The former, in the construction illustrated, consists of a bar 307$^a$ mounted in suitable guides 307$^b$ (Fig. 4) and having pins 308 and 309 spaced apart to correspond with the intervals between the tails of the feed and check pawls 307 and 304, respectively, so that no matter where the pawl frame may be adjusted with relation to the guide 310, in order to associate the pawl-operating lever 302 with the uppermost block 107 of a group of connected candidate series of counters, the tails of said feed and check pawls will occupy positions above corresponding pins 308 and 309 of the releasing bar. Upward movement of this bar to trip the feed and check pawls and thus permit the rack 306 to return by gravity to its normal position, is effected by means of a lever 307$^c$ fulcrumed upon a suitable bracket 307$^d$ and having its extremity 307$^e$ arranged in the path of the downward movement of the releasing frame 41. In order to insure the return of the limiting bar or rack, however, the replacing device above mentioned is employed, the same consisting of a bar 139 connected by means of a link 142 to a crank 141 on the re-setting shaft 39, mounted in suitable fixed guides 140, and carrying a replacing arm 143 for engagement with a trip arm 313 secured to the rack 306.

The replacing device for the lock-out or restrictive pins 115$^x$ consists of a replacing bar 316 connected by a link 317 with a crank arm 319 on the rack shaft 320, said bar being provided with cam faces for engagement with lateral pins 115$^b$ projecting from the lock-out pins 115$^x$. Thus, it will be seen that as the replacing bar 404, in the construction illustrated, rises to replace the spacers the bar 316 is depressed to replace the lock-out pins, so that as a restricted voter leaves the booth the operation in one direction of the resetting shaft 39 returns all of the operating and restricting parts to their normal positions, and said parts remain locked in their reset positions until the succeeding voter, by turning the resetting shaft 39 in the opposite direction, releases the various movable parts, including the counters, spacers, lock-out pins, etc.

It will be seen from the foregoing description that an important feature of the present invention resides in the fact that while the voting operation of the operated element of a counter-actuating device is dependent on the operating element, the return of said operated element is independent of the operating element, and being due either to the positive replacing devices actuated by the resetting shaft 39 as the voter leaves the booth, or (as in cumulative voting) by the return spring 356; and, therefore, should the locking devices for the operating elements of the counter-actuating devices fail to secure said operating elements in their repressed positions, the withdrawal of the operating element will not permit the voter to register another vote on that counter for the reason that the operated element will retain its voted position. Moreover, an important function of the supplemental interlocking devices resides in the fact that whereas, if the secondary interlocking devices are depended upon to prevent the actuation of a greater number of counters than the voter is entitled to, a slight sluggishness in the return to its normal or depressed position of the uppermost block 107 of the group may be taken advantage of by the voter by pushing a second key of the group while withdrawing the second one, and thus catching the block 107 before it can drop, and thus preventing the advance of the limiting bar, the supplemental interlocking devices positively lock all of the spacers in a group until the last operated key has been entirely withdrawn, thus permitting the uppermost block 107 to resume its normal position and allow the operating pawl 307 of the limiting rack to engage the next lower tooth of the rack before a succeeding key can be actuated.

Having described the invention what is claimed is—

1. In a voting machine, the combination with counter-actuating devices, of interlocking means for the same, having cams, adjustably variable in contour, for engagement by said devices.

2. In a voting machine, the combination with counter-actuating devices, of interlocking means for the same, having cam slots for engagement by said devices, and relatively movable elements for varying the contour of the slots.

3. In a voting machine, the combination with counter-actuating devices, of interlocking means for the same having relatively adjustable elements respectively carrying complementary cam members for engagement by said counter-actuating devices.

4. In a voting machine, the combination with counter-actuating devices, of interlocking means for the same having relatively adjustable elements consisting of slides carrying complementary cam members for engagement by the counter-actuating devices.

5. In a voting machine, the combination with counter-actuating devices, of interlocking means for the same consisting of relatively adjustable slides having complementary cam slots for engagement by the counter-actuating devices.

6. In a voting machine, the combination with counter-actuating devices, of interlocking means for the same having cams for engagement by the counter-actuating devices and variable in contour to prevent or permit independent movement of the interlocking means after the completion of a full-stroke movement of a counter-actuating device.

7. In a voting machine, the combination with counter-actuating devices, of interlocking means for the same, having cams for engagement by the counter-actuating devices to impart an advance and return movement to the interlocking means during one full-stroke movement of the counter-actuating devices.

8. In a voting machine, the combination with counter-actuating devices capable of linear movement, of interlocking means capable of linear movement in a direction at an angle to the paths of the counter-actuating devices, and having cams of zig-zag contour for engagement by the counter-actuating devices, whereby a positive advance and return movement of the interlocking means is received during a single full-stroke movement of the counter-actuating device.

9. In a voting machine, the combination with counter-actuating devices, of interlocking means for the same, having relatively adjustable elements forming cams for engagement by the counter-actuating devices, the cams being variable in contour by the adjustment of said elements to vary the extent of movement imparted by the counter-actuating devices to the interlocking means.

10. In a voting machine, the combination with counter-actuating devices, of interlocking means for the same, having cams for engagement by the counter-actuating devices, the cams being variable in contour to vary the directions of movement imparted by the counter-actuating devices to the interlocking means.

11. In a voting machine, the combination with counter-actuating devices, of interlocking means for the same having relatively adjustable elements forming cams for engagement by the counter-actuating devices, the cams being variable in contour by the adjustment of said elements to vary the position occupied by the interlocking means at the end of a full-stroke movement of the counter-actuating devices.

12. In a voting machine, the combination with counter-actuating devices, of interlocking means for the same, having cams for engagement by the counter-actuating devices to impart advance movement to the interlocking means during a full-stroke movement of the counter-actuating device, said cams being variable in contour to cause advance and return movements of the interlocking means during one full-stroke movement of a counter-actuating device.

13. In a voting machine, the combination with counter-actuating means each common to a single-candidate series of counter-actuating devices, of interlocking means for the same, having cams for engagement by the counter-actuating devices to impart advance movement to the interlocking means during a full stroke movement of the counter-actuating device, and secondary interlocking devices having members connected respectively with said interlocking means, said cams being variable in contour to vary the relative positions of the members of the secondary interlocking devices at the end of each full-stroke movement of the counter-actuating devices.

14. In a voting machine, the combination with counter-actuating devices, of interlocking means having cams for engagement by the counter-actuating devices, and secondary interlocking devices having members carried respectively by said interlocking means, said cams being constructed to cause a positive advance and return movement of the interlocking means during one complete advance stroke of the counter-actuating devices.

15. In a voting machine, the combination with a key, of a slide, operatively connected with the key to receive advance and return movement in opposite directions by a single full-stroke movement of the key.

16. In a voting machine, the combination with counters and actuating devices therefor arranged in single-candidate series, of interlocking slides respectively common to and operatively related with the counter-actuating devices of the single-candidate series, and supplemental interlocking devices having cams for engagement by elements of the slides and provided with stops for obstructing the movement of the slides.

17. In a voting machine, the combination with counters and actuating devices therefor arranged in single-candidate series, of interlocking slides respectively common to and operatively related with the counter-actuating devices of the single-candidate series, and supplemental interlocking devices having tumblers provided with cams for engagement respectively by the slides and with stops for obstructing the movement of the slides, and means for connecting the tumblers in series.

18. In a voting machine, the combination with counter-actuating devices arranged in single-candidate series and slide interlocking devices each common to a single-candidate series, of a supplemental interlocking device having tumblers provided with cams for engagement by the slides, and stops for arrangement in the paths of the slides, and movable links for grouping the tumblers.

19. In a voting machine, the combination with counter-actuating devices and full-stroke interlocking devices having slides common to and operatively related with the counter-actuating devices, of a slide-replacing device having means for locking the slides in their normal positions.

20. In a voting machine, the combination with counter-actuating devices and full-stroke interlocking devices having slides common to and operatively related with the counter-actuating devices, of a reciprocatory slide-replacing device having cams for engaging the slides, and adjacent stops for securing the slides in their normal positions.

21. In a voting machine, the combination with counter-actuating devices, of interlocking devices provided with advance and return motion communicating means for engagement by the counter-actuating devices whereby during a single full-stroke movement of a counter-actuating device, the related interlocking device is positively moved into and then out of locking relation with other counter-actuating devices.

22. In a voting machine, the combination with counters and movable means for connecting the same in single-candidate series, of grouping devices having a guide, interlocking blocks for alined movement in the guide, spacers operatively connected with said connecting means for movement transverse to the path of the interlocking blocks and having cams for terminally separating the same, and filling blocks for interposition between adjacent interlocking blocks to convey motion from one of the said blocks to the next in the group whereby the terminal interlocking block of the group may be actuated by either of said spacers, and limiting mechanism operatively connected with the terminal interlocking block of the group.

23. In a voting machine, the combination with counters and movable means for connecting the same in single candidate series, of grouping devices having a guide, independently movable interlocking blocks arranged in the guide, cam-carrying spacers for respective actuation by said connecting means to move in paths transverse to the path of said blocks, and also capable of movement in the direction of the path of the block, stops for limiting the movement of the spacers in the direction of the paths of the blocks, filling blocks for interposition between the interlocking blocks to communicate motion from one interlocking block to the next in the group, and limiting mechanism operatively connected with the terminal interlocking block of the group.

24. In a voting machine, the combination with counters and movable means for connecting the same in single candidate series, of grouping devices having interlocking members and coöperating spacers actuated by said connecting means, and limiting mechanism having a regulating member capable of a limited step-by-step movement, an actuator for said regulating devices for communicating step-by-step motion thereto, and means for operatively connecting either of said movable members to the actuator.

25. In a voting machine, the combination with counters and movable means for connecting the same in single-candidate series, of grouping devices having independently movable interlocking members, a regulator capable of step-by-step movement, an actuator for communicating motion to said regulator, and having an operating arm adjustable with relation to said interlocking members, and means for communicating motion from either of said interlocking members to said operating member.

26. In a voting machine, the combination with counters and movable means for connecting the same in single-candidate series, of grouping devices having interlocking members and coöperating spacers actuated by said connecting means, a regulator capable of a limited step-by-step movement, an actuator for said regulator having a support capable of adjustment parallel with the series of interlocking members, and an operating arm mounted upon said support and provided with means for engaging said regulator to communicate motion thereto, and means for communicating motion from either of said interlocking members to said operating arm.

27. In a voting machine, the combination with counters and movable means for connecting the same in single-candidate series, of grouping devices having a series of interlocking members and coöperating spacers actuated by said connecting means, a regulator capable of a limited step-by-step movement, and an actuator for said regulator, comprising a pawl, a support adjustable parallel with the series of interlocking members, and an operating arm carried by said support for arrangement in operative relation with either of said operating members and connected with said pawl.

28. In a voting machine, the combination with counters and movable means for connecting the same in single-candidate series, of grouping devices having interlocking blocks provided with lateral projections and coöperating spacers actuated by said connecting means, a regulator capable of a limited step-by-step movement, and an actuator having a feed pawl for engaging the regulator, a support for adjustment parallel with the series of interlocking members, and an operating arm mounted upon said support, carrying the feed pawl and adapted for arrangement in operative relation with either of said projections on the interlocking members.

29. In a voting machine, the combination with counters and movable means for connecting the same in single-candidate series, of grouping devices having interlocking members and coöperating spacers actuated by said connecting means, a regulator having a guide and a limiting bar capable of step-by-step movement in the guide, changeable stops for determining the initial and terminal positions of said bar, and an actuator having a support adjustable parallel with the series of interlocking members, an operating arm carrying a feed pawl for engaging the limiting bar and adapted for arrangement in operative relation with either of said interlocking members, and a check pawl carried by the support for maintaining the limiting bar in its adjusted positions.

30. In a voting machine, the combination with counters and movable means for connecting the same in single-candidate series, of grouping devices having interlocking members and coöperating spacers actuated by said connecting means, a regulator comprising a guide, a limiting rack bar mounted in the guide, and terminal stop pins removably engaged with seats in the guide to determine the initial and terminal positions of the rack bar, and an actuator comprising a frame adjustable parallel with the series of interlocking members, and feed and check pawls for said rack bar, an operating arm for said feed pawl carried by the support, and means for securing the support in its adjusted positions, with said arms in operative relation with either of said interlocking members.

31. In a voting machine, the combination with counters and movable means for connecting the same in a single-candidate series, of grouping devices having interlocking members and coöperating spacers actuated by said connecting means, a regulator comprising a guide, a rack bar and changeable stops for determining the initial and terminal positions of the bar, an actuator having a support adjustable parallel with the series of interlocking members, feed and check pawls for said bar carried by the support, and means for communicating motion from one of the interlocking members of the feed pawl and adapted to be arranged in operative relation with one of said members by the adjustment of the support, and a releasing bar having a plurality of tripping means for engagement with said pawls and spaced to engage the same at different adjustments of the support.

32. In a voting machine, the combination with counters and movable means for connecting the same in single-candidate series, of grouping devices having interlocking members and coöperating spacers actuated by said connecting means, a regulator mounted for step-by-step movement, adjustable means for determining the initial and terminal positions of the regulator, an adjustable actuator for communicating motion to the regulator and adapted for arrangement in operative relation with either of said interlocking members, a releasing device for disengaging the regulator from the actuator, and a replacing device having an adjustable member for engaging the regulator to return it to its initial position.

33. In a voting machine, the combination with counter-actuating devices and a series of movable members for actuation thereby, of a regulator mounted for a step-by-step movement by said movable members, and replacing mechanism having a plunger provided with an adjustable arm to impart return movement to the regulator.

34. In a voting machine, the combination with counter-actuating devices and a series of movable members for actuation thereby, of a regulator mounted for a step-by-step movement by said movable members, a projection on the regulator, a plunger having an adjustable arm for engagement with the projection, and resetting mechanism connected with the plunger.

35. In a voting machine, the combination with a limiting mechanism, of a plunger operating in conjunction therewith to return portions of the same to normal positions, an arm adjustably mounted on said plunger, the plunger and arm having coacting milled surfaces, and a clamping device carried by the arm to bear against the plunger and hold the arm in adjusted position on the plunger.

36. In a voting machine, the combination with counter-actuating devices, of a guide and a series of movable members for actuation by the devices, movable lock-out pins for engaging said members, and a friction rod interlaced with said pins for holding them in their adjusted positions.

In testimony that I claim the foregoing as my own, I have hereto affixed my signature in the presence of two witnesses.

LENNA RYLAND WINSLOW.

Witnesses:
W<small>M</small>. C. L<small>EWIS</small>,
E<small>MILIE</small> W<small>INSLOW</small>.